United States Patent Office 3,067,103
Patented Dec. 4, 1962

3,067,103
HEALING-ENHANCING PREPARATIONS COMPRISING *GARDENIA FLORIDA* SEED EXTRACT AND PHARMACEUTICALLY ACCEPTABLE CARRIER FORMULATIONS
James Y. P. Chen, 819 McNaughton Ave., Elkhart, Ind.
No Drawing. Filed July 22, 1960, Ser. No. 44,571
7 Claims. (Cl. 167—65)

This invention relates to a composition containing a plant extract. More particularly it embraces a galenical composition which is highly effective for rapidly diminishing the inflammation, pain, tenderness and disability accompanying traumatic soft tissue injuries. In one of its many embodiments such a composition may be prepared in the form of an ointment and is suitably administered by topical application to such soft tissue injuries.

Heretofore the standard treatment for such acute soft tissue injuries as accompany sprains, bruises, superficial swellings and the like has included hydrotherapy, hot and cold compresses, elastic bandaging and application of adhesive tape, administration by injection, among other methods, of trypsin and other enzyme preparations, cortico-steroid compositions, and more recently the buccal administration of preparations containing streptokinase in addition to other ingredients. However, none of these remedial measures have been found to have the efficacy, ease of application and absence of side effects inherent in the topical ointment hereinbelow disclosed.

It is an object of this invention to provide a composition containing a plant extract which is of marked efficacy when applied topically.

It is a further object of this invention to provide a composition containing a galenical substance which is stable and retains its potency for a considerably extended time interval.

A still further object is the provision of a galenical composition which is easily prepared, economical to produce and highly efficient in its action.

Still other objects and advantages will become apparent hereinafter from the accompanying disclosure and description.

In their reaction to an injury such as a bruise, a sprain or the like, the body tissues involved respond with an accompanying inflammation, swelling and pain. In such cases, the topical application of an ointment containing the plant extract of this invenion shortens those undesirable phases causing pain, tenderness and inconvenience, limits the accompanying tissue damage and possible necrotic changes due to inflammatory infiltration and initiates a constructive phase which speeds up and accelerates total recovery. As a result of the application of this ointment, injuries which heretofore required 5 or more days and often 1 to 2 weeks to effect complete healing almost invariably show complete remission of disability within a period of 12 to 24 hours. The response elicited by the composition of this invention is thus frequently extraordinary and often dramatic.

In the practice of this invention a composition of matter for therapeutical administration to an injured member is preferably prepared in the form of an ointment adapted for topical application as described hereinbelow. However, this invention may be variously otherwise embodied in accordance with the following illustrative examples and may assume such further and modified forms as may be necessary for its most effective pharmacological and clinical evaluation and preferably in accordance with usual pharmaceutical practice.

EXAMPLE 1

The husks and kernels of a batch of *Gardenia florida* seeds were separated and the kernels were ground. About 60 pounds of the shelled and powdered kernels was obtained from 100 pounds of the dried whole seed.

5.875 kg. of the ground kernels was extracted by the addition of 20 liters of 95% ethanol. The mixture was stirred at room temperature overnight. It was then refluxed gently with continued stirring for 1½ hours after which it was filtered while hot and the filter-cake washed with 95% ethanol. The filtrate was then transferred to a steam-jacketed kettle and evaporated down to 2½ liters. This residue was transferred to a wide-mouthed flask equipped with a stirrer and the remaining solvent was evaporated under reduced pressure on a water bath leaving a residue weighing 1260 gm.

After standing for two hours, this residue separated into a supernatant oil and a heavy, viscous taffy-like material. The oil was decanted off and the viscous residue was washed about four times with ether and transferred to a vacuum drying oven. After grinding this dried material in a mortar with ether and drying the mixture in a vacuum desiccator there remained a bright orange solid in the form of a powder weighing about 945 gm.

A second extraction of the previously extracted filter cake with another 20 liter portion of 95% ethanol, followed by filtration and evaporation of the filtrate as in the first extraction, yielded a residue weighing 315 gm. This residue did not separate into two layers as in the previous extraction but the addition of 750 ml. of ether to this residue with stirring, followed by filtering, washing and drying the filter cake in a vacuum desiccator yielded 183 gm. of a bright orange solid material.

Concentration of the ether washings by evaporation to dryness on a water bath yielded about 460 gm. of oil. Combining the two portions of solid material recovered in the two extractions yielded about 1128 gm. of the desired gardenia seed extract for incorporation in an ointment base for subsequent clinical use.

EXAMPLE 2

100 gm. of the ground kernels of *Gardenia florida* seeds were refluxed with constant stirring for three hours with 500 ml. of petroleum ether. The undissolved solid material was filtered and dried to yield a filter cake weighing 92 gm. Evaporation of the ether extract to dryness yielded 8 gm. of a brown colored oil.

Extraction of the filter cake with another 500 ml. portion of ether, followed by filtration and drying yielded 91 gm. of a solid material. This solid material was extracted with constant stirring under reflux with 500 ml. of 95% ethanol for 4 hours. This ethanol extract was then filtered and the alcohol evaporated to yield 14 gm. of an orange colored solid extract of gardenia seeds for subsequent clinical use.

EXAMPLE 3

64 pounds of the ground kernels of *Gardenia florida* seeds was extracted by the addition of 50 gal. of 95% ethanol. The mixture was stirred at room temperature overnight. The next day it was refluxed gently with continued stirring for 1½ hours. Then the mixture was filtered to separate the ground seeds and the filtrate evaporated to dryness on a water bath and under reduced pressure to yield a solid residue.

After standing for a short interval, this residue separated into a supernatant oily layer and a heavy viscous taffy-like material. The oily layer was decanted off and the viscous taffy-like material was washed with ether to remove additional oil and then dried to yield the desired extract.

A second extraction of the previously filtered and separated ground seeds with another 50 gal. portion of 95% ethanol, followed by filtration and evaporation of the filtrate and treating the residue with ether to again remove any oily layer yielded another portion of a viscous taffy-like material which when combined with the first extracted portion resulted in a yield of 4980 gm. of the desired gardenia seed extract for incorporation in a therapeutic composition for subsequent clinical tests.

EXAMPLE 4

An ointment serving as an effective, simple and convenient means for the topical administration of the essential ingredients contained in any one of the above extracts of *Gardenia florida* seeds (Examples 1 through 3) was prepared by mixing the following ingredients:

|  | Gm. |
|---|---|
| A water miscible ointment base * comprising a stabilized aqueous emulsion of fatty acid esters | 6,080.0 |
| *Gardenia florida* extract | 1,092.2 |
| Distilled water | 109.2 |
| Odor enhancing materials (i.e. pepermint, among other excipients) | 218.4 |
|  | 7,500.00 |

* Available commercially as "Dermabase" from the Borden Company.

The *Gardenia florida* extract was broken into small chunks and then further pulverized in a Waring Blendor. Thereafter the water was added and allowed to soak into the powdered extract until the latter was softened. This usually required about one or one and one-half days. The ointment base to which the odor enhancing materials had been added was then mixed thoroughly with the water-softened extract and this mixture was passed through a roller mill until all lumps had been thoroughly dispersed. After a short mixing step in a planetary mixer to insure complete homogenizing, the ointment was packaged in containers suitable for easy application. As applied, the ointment had a light yellowish orange color and contained about 14% of the gardenia seed extract in its water miscible ointment base.

The ointment herein described in considerable detail containing the extract of *Gardenia florida* seeds exhibits an exceptional anti-inflammatory and anti-edema action when applied topically to injuries such as bruises, hematomas, sprained joints, injured ligaments and similar traumatic dysfunctions which result from contact sports (football, baseball, wrestling, etc.). With the topical application of this ointment to such soft tissue injuries the alleviation of such accompanying symptoms as swelling, pain, tenderness and disablement is especially quick and particularly striking. Furthermore, such injuries exhibit considerably curtailed recovery periods especially upon immediate or early application of this ointment.

In the treatment of each injury, the affected area of the body was covered with a thin layer of the ointment containing the gardenia seed extract as soon after trauma as possible in accordance with the following detailed description:

*Application of Ointment*

(1) Ointment is applied with a tongue depressor.
(2) The injured part as well as the area 2-3 inches beyond the injured part should be covered evenly with a thin layer of ointment (about 1 mm. in thickness—the treated skin should not be visible).
(3) A covering or bandaging material is used which will not absorb the ointment, i.e. plastic covered cotton, telfa pads, or similar material.
(4) Tubegauze with a finger applicator can be used to hold above covering in place on fingers and toes.
(5) Elastic bandages should be used on ankles, knees, arms, elbows, thighs and other areas where support is needed, and in some cases adhesive tape is used for additional support.
(6) Ointment is applied every 12 hours whenever possible.
(7) Residue of the prior supply of ointment should be washed off before subsequent application of a new supply.

*The Pharmacology of the Extract and an Ointment Containing the Extract*

As a result of the following study of the acute and subchronic pharmacological characteristics of the seed extract as prepared by the methods of Examples 1 through 3 and the study of the ointment containing the extract described in Example 4, it was determined that the ointment could be used safely in clinical trials on patients.

ACUTE TOXICITY AND PHARMACOLOGICAL PROFILE

The acute profile for the extract was determined in Sprague-Dawley rats, and the findings were extended to mongrel dogs and New Zealand rabbits. Using five rats per dose, the oral A–LD50 and the A–ED50s for other effects were evaluated according to the Thompson-Weil (Biometrics, 8, 51, 249, 1952) procedure which employs quantal scoring and geometric spacing of doses ($\times 1.5$). Special tests will be described later in the text.

SUBCHRONIC TOXICITY AND PHARMACOLOGICAL PROFILE

The subchronic two-group increasing dose schedule (ID2) for determining changes in lethal and toxic dose levels for the extract on daily dosage, and the subchronic four-group constant dose schedule (CD4) for evaluating changes at low dose levels, were carried out in rats. The first (ID2) schedule was administered to two groups of five rats each starting with an oral dose of 9% A–LD50 per day for four days, and then increasing the dose by a factor of 1.5 after each four-day period until death occurred. Hematological examination was carried out 4 days prior to the start and at 7, 14 and 21 days of administration. Two additional animals, treated in the same fashion, were sacrificed on the 21st day for pathology and histological examination of the stomach, small intestine, colon, liver, spleen and kidney. Starting dose levels have to be reduced and the test repeated if cumulation occurs. (Lim et al., Fed. Proc., 119, 160, 1957.)

The second (CD4) schedule was administered to four (or more) groups of five rats each, each group receiving a different but constant daily dose. The series of doses, which bracketed the A–ED50s for "blue urine" and "diarrhea," was given for a period of 21 days. A control group received an equivalent amount of water. Food intake and body weight, water intake and urine output were recorded. The dose levels have to be adjusted up or down, and the test repeated if tolerance or cumulation develops. For further details of both tests see MSRL Methods Manual.

Rabbits were used to investigate mucous membrane irritation of the extract and subchronic dermal toxicity and irritation. Both were done according to procedure modified from Draize ("Dermal Toxicity," publ. by Assn. Food Drug Officials U.S.; State Dept. Health, Austin, Texas, 1959).

RESULTS

ACUTE TOXICITY AND PHARMACOLOGICAL PROFILE

*Rats.*—The oral pharmacological profile of the extract is summarized below in terms of the median effective doses for certain effects.

TABLE 1

*Acute Oral and Intraperitoneal Pharmacological Profiles in Rats*

| | Urine coloration, percent | Writhing, percent | Diarrhea, percent | A-LD50 (RatOR) Percent | A-LD50 mg./kg. |
|---|---|---|---|---|---|
| Oral Profile. Extract— | | | | | |
| Males | <6 Blue | None | 21 | 100±13 | 3,540 |
| Females | <7 Blue | None | 17 | 100±14 | 3,270 |
| Mean | <6 Blue | None | 19 | 100±14 | 3,400 |
| Ointment | <36 Blue | None | 77 | 100±11 | 37,200 |
| | | | | (RatIP) | |
| Intraperitoneal profile: Extract— | | | | | |
| Females | <17 Yellow | <17 | None | 100±8 | 5,145 |

Percent, ED50 given in percent of the A-LD50; OR, oral; IP, intraperitoneal.

On acute oral administration of doses below 50% A-LD50, of the extract did not produce hyperkinesis or hypnosis, and apparently had little effect on the central nervous system, or on the cardiovascular or respiratory system, but did cause the urine to turn blue, and induced diarrhea. The appearance of blue urine occurred with all doses ≥6% A-LD50, after a latency of about two hours. Diarrhea appeared usually within the first hour after 19% A-LD50 had been administered. Six hours after oral administration of 45% A-LD50 (or 1,620 mg./kg.) of the extract, the plasma was of normal color after centrifugation, but the urine was blue and the cecum contained blue-green material. After 24 hours, the plasma and urine were both normally colored. With higher doses, death occurred without further symptoms in 12 to 48 hours; any terminal changes which occurred at night were not observed.

On acute intraperitoneal administration, the extract caused writhing within 20 minutes and the voiding of orange-yellow, not blue, urine after about 40 minutes at the lowest dose used (17% A-LD50, RatIP). The skin (ears, paws and body) also turned yellow about an hour after drug administration and remained so for 24 to 48 hours. One and two hours after intraperitoneal administration of 90% A-LD50 (or 4,600 mg./kg.) of the extract, an orange-yellow color developed in the plasma as well as in the skin and other organs. A large amount of unabsorbed extract remained in the peritoneal cavity. There was no diarrhea. Death occurred in three hours at the highest dose used (6,800 mg./kg.), but was delayed for 24 hours at the next lower dose.

*Rabbits.*—Both oral and intraperitoneal effects of the extract at 1000 mg./kg. were verified in two rabbits each, but a complete profile was not run. Blue colored urine appeared after oral administration, and yellow colored skin and urine after intraperitoneal injection. Rabbits were also used to assess mucous membrane irritation. For this, 0.1 ml. of a 20% suspension of the extract at pH 3.7 was instilled into the right eye of each of 5 rabbits. No evidence of corneal anesthesia or of any subsequent irritation was observed.

*Dogs.*—When given orally to two dogs at a dose of 500 mg./kg., blue urine and soft tarry stools were passed. Tests for the presence of blood in the feces were negative. One dog vomited about one hour after drug administration. A cumulative intravenous toxicity study in an unanesthetized dog showed that a drop of blood pressure and depression of respiration first occurred when 78% of the intravenous lethal dose (or 420 mg./kg.) had been infused, and death following respiratory arrest terminated the test when 540 mg./kg. had been given. At 4% of the IV lethal dose, the extract did not block the effect of either acetylcholine or adrenaline at 4 mcg./kg.

MISCELLANEOUS

*Autonomic activity.*—In in vitro tests, using isolated segments of guinea pig ileum suspended in Tyrode's solution, the extract was found to be inactive. It produced no response of its own in concentrations up to 100 mcg./ml. nor did it block the contractions induced by 1 mcg./ml. of either acetylcholine or histamine. In vivo tests in the dog (see above) showed that the extract had no anti-adrenergic activity.

*Analgetic activity.*—A topical application of the ointment produced no alteration on the pressure threshold of the normal or the yeast-inflamed rat foot using a modified Randall and Selitto (Arch. Int. Pharmacodyn., 111, 409, 1957; ibid., 113, 233, 1957) method for screening nonnarcotic analgesic agents. The tests were made 1 and 3 hours after application of ointment, corresponding to 4 and 6 hours after injection of yeast into the plantar subcutis of the rat's hind paw.

SUBCHRONIC TOXICITY AND PHARMACOLOGICAL PROFILE

The subchronic oral pharmacological profile of the extract in rats shows that it has a cumulative (or sensitizing) effect at high doses. The oral C-LD50 determined by the increasing dose (ID2) method was 52% of the A-LD50 (RatOR). Blue urine was excreted from the first dose (9% A-LD50/day), and polydipsia and polyuria became apparent a few days later. Diarrhea appeared at the 30% A-LD50/day dose. Weight loss was evident at 45% A-LD50/day or earlier.

With constant daily dosage at four (or more) different levels for 20–21 days by the Cd4 method, blue urine appeared for the first 2–3 days at a dose of 2.8% A-LD50/day, but at this and higher doses up to 6% A-LD50/day, the blue color disappeared after seven days. At doses ≥9% A-LD50 day the blue color remained throughout the duration of treatment. Polydipsia and polyuria became apparent in 2–3 days at doses ≥13.5% A-LD50/day, and was part of a transient hyperpolydipsia and hyper-polyuria which subsided by the 12th day to a lower level which was maintained at a level depending upon the dose administered. Thus the CED50 for the initial transient effect on fluid balance was 11% A-LD50/day and that for the maintained effect which followed was 7.3% A-LD50/day. Food intake and body weight exhibited a similar parallel change at the same dose ranges, there being a transient but marked reduction of intake with weight loss during the first 8–12 days with doses ≥13.5% A-LD50/day, and a lesser reduction after 12 days which was maintained at a level depending upon the dose given. No diarrhea occurred with constant daily dosage below 30% A-LD50/day. These results suggest that there is little or no cumulative or sensitizing effect on subchronic dosage at low levels.

*Local toxicity.*—Applied daily as an ointment (containing 14% of the extract) to about 10% of the shaven abdominal skin in rabbits for 21 days, caused no symptoms or any sign of local skin irritation and did not color the urine blue or yellow. It is evident that of a total of 6 gm./kg./day which was applied, the amount of the extract contained in the ointment and absorbed into the systemic circulation was insufficient to color the urine if any was excreted.

*Pathology.*—Daily oral administration of 30% A-LD50/day of the extract in the constant dose (CD4) studies caused marked fatty degeneration of the liver involving the entire lobule, with some cellular reaction (fibroblastic replacement of damaged liver cells) in the portal areas. Fatty change was present in the cells adjacent to the portal areas in some rats given 13.5% A-LD50/day, but was absent in others at the 20% A-LD50/day dose. Fatty degeneration was also found in the renal cortical tubules, the ascending loops of Henle and in the epithelium lining part of the renal pelvis. Occasional nephrons with fatty droplets, and extratubular cells in the medulla containing fine fat globules, were seen in the kidney of some rats treated with 13.5% A-LD50/day. There was no obvious pathology in the other tissues examined (stomach, small and large intestines and spleen). The red and white blood cell counts were normal on the 7th day (13.5% A-LD50/day) and 14th day (30% A-LD50/day), but on the 21st day on the 45% A-LD50/day dose, the counts were high as a consequence of hemoconcentration. It is evident that although blood changes are not apparent at 30% A-LD50/day, tissue changes may occur at 13.5% A-LD50/day and that only doses below this figure do not induce any pathology.

These studies indicate that topical application of the ointment is safe for human clinical use.

A characteristic feature accompanying the topical application of this ointment is the formation of a bluish discoloration at the situs of the ointment coated tissue injury. In addition, the rapid healing effected by this ointment leaves very little opportunity for any scar or fibrous tissue formation around an injured member or within an injured body tissue such as generally results when these injuries are subjected to conventional methods of therapy. Furthermore the duration of the usual period of restricted motion and stiffness accompanying contact injuries is considerably curtailed upon the application of this ointment.

The effectiveness of this locally administered ointment containing an extract of gardenia seeds for the treatment of traumatic injuries was amply illustrated with the aid of a wealth of clinical material available in the form of such traumatic injuries as result from participation in contact sports, i.e., basketball, baseball, football, wrestling, among others.

The following clinical results and case histories illustrate the efficacy of this ointment.

(1) In one case an ointment containing the plant extract herein described was topically applied in a phalangeal dislocation. After reduction, this type of injury is invariably followed by swelling, inflammation and dysfunction for from three to ten days. However, in this case, 24 hours after application of this ointment there was no evident swelling or inflammation and motion was well within normal limits.

(2) In a case involving a sprained condition of the index finger accompanied with a moderate amount of pain and disability, the application of this ointment within one hour after the injury was followed by complete recovery within 24 hours.

(3) Where a contused quadriceps muscle of the left leg, accompanied by moderate pain and disability, was treated by the topical application of this ointment, a complete recovery was effected after 48 hours.

(4) Treatment of a contused left hand and ring finger, accompanied by moderate pain and disability, also showed complete recovery within 48 hours after application of this ointment.

(5) A contact injury to the index finger of the left hand treated with the ointment of this invention showed complete recovery 12 hours after topical application.

(6) A traumata involving tendon and muscle tissue behind the knee which would normally necessitate 1 week of disability responded by complete recovery 72 hours after the topical application of the ointment disclosed herein.

(7) A bruised and sprained ankle was treated 24 hours after the injury occurred by application of the present ointment. This type of injury which is normally accompanied by at least 1 week of disability showed complete recovery within 48 hours.

This ointment may also be utilized in the treatment of artificially induced injuries (especially for comparative evaluation techniques), burns, ulcers, abscesses, etc. as the following clinical results and case histories illustrate.

(8) A compared evaluation of the healing effect of the topical application of the present ointment to bruises produced by crushing skin areas between the jaws of a sponge forceps was effected utilizing the Sulzberger paired technique. In this test bruises were induced on the anterior surfaces of the right and left forearms of such intensity to produce subcutaneous hemorrhage and develop as a first degree ecchymosis 24 hours after the injury. Applying ointment twice daily to the left forearm bruise showed complete healing after 3 days whereas the untreated area did not completely heal until the 5th day.

(9) In similarly induced paired bruises where second degree ecchymosis developed 24 hours after the injury, ointment was applied to the left forearm twice daily and showed complete healing at the end of 4 days. The untreated area required seven days for complete healing. Neither of these induced injuries showed any side reactions to the medication.

(10) Irradiation with ultra-violet rays was used to induce what developed 24 hours later into a second degree erythema over 2.5 cm. by 2.5 cm. areas on the anterior surfaces of the right and left thighs. The left thigh was treated with the ointment of this invention twice daily while the right thigh remained untreated. Although the erythema in this case was rather severe, the treated area revealed almost complete healing at the end of 7 days whereas the untreated area still showed a markedly persistent erythema such as accompanies a painful burning.

(11) J. W., a young female, suffering from sickle cell anemia, had an ulcer approximately 3 cm. in diameter involving the medial aspect of the right ankle. This ulcer had been refractory to all previous forms of therapy. The present topical ointment was the only medication which the patient could tolerate, other forms of therapy including anti-bacterial and healing ointments produced intolerable pain. Treatment consisted in filling the crater of the ulcer twice daily with the ointment of this invention together with the application of a light bandage. At the end of one week of treatment the base of the ulcer showed the development of clean granulation tissue and incipient healing in contrast to the necrotic tissue present over the base of the ulcer prior to the present treatment. At the end of two weeks of treatment the ulcer showed signs of marked subsidence and an overall total improvement, the base was clean and covered with healthy looking granulation tissue. There were no side reactions to the medication.

(12) W. E., a female patient had a marked stasis dermatitis of the right leg which was complicated by an ulcer involving the medial side of the ankle. Treatment consisted in applying the ointment of this invention to the ulcerated area twice daily. After a few days there were signs of rapid healing of the ulcer. At the end of seven days of treatment the ulcer was completely healed.

The foregoing clinical results clearly disclose that a composition containing an extract of *Gardenia florida* seeds, for example in the form of an ointment, possesses marked utility, effectiveness and reliability when topically administered in the treatment of soft tissue injuries.

Although the composition herein disclosed is illustrated in the form of an ointment, it is to be noted that certain changes may be made and that different embodiments of the invention may be formulated without departing from the scope thereof, and that the subject-matter described herein is merely illustrative and not limitative.

What is claimed is:

1. A composition having enhanced healing properties when applied to soft tissue injuries comprising an extract of *Gardenia florida* seeds and a pharmaceutically acceptable carrier for said extract.

2. A preparation according to claim 1 wherein the carrier is a water miscible ointment base.

3. A preparation according to claim 1 containing an alcoholic extract of *Gardenia florida* seeds.

4. A preparation according to claim 1 wherein the carrier is a water miscible ointment base containing a stabilized emulsion of fatty acid esters.

5. A galenical composition having enhanced healing properties when applied to soft tissue injuries and wherein the active ingredient is an extract of *Gardenia florida* seeds.

6. A galenical composition comprising an ointment base and an extract of *Gardenia florida* seeds.

7. A preparation according to claim 5 wherein the active ingredient is a therapeutically effective amount of the *Gardenia florida* seed extract.

References Cited in the file of this patent

Hocking: "Dictionary of Pharmacognosy," Chas. C. Thomas Co., Springfield, Ill., 1955, entry *"Gardenia grandiflora,"* p. 91.